3,794,470
CONTINUOUS PLUTONIUM DISSOLUTION APPARATUS
Frank G. Meyer and Charles N. Tesitor, Boulder, Colo., assignors to the United States of America as represented by the United States Atomic Energy Commission
Filed June 6, 1972, Ser. No. 260,155
Int. Cl. B01d 11/02
U.S. Cl. 23—272.6 S                                    1 Claim

ABSTRACT OF THE DISCLOSURE

This invention is concerned with continuous dissolution of metals such as plutonium, wherein a high normality acid mixture is fed into a boiler vessel, vaporized and subsequently condensed as a low normality acid mixture, then conveyed to a dissolution vessel and contacted with the plutonium metal so as to dissolve the same in the dissolution vessel, reacting therewith forming plutonium nitrate, and the reaction products are then conveyed to the mixing vessel and maintained soluble by the high normality acid, with separation and removal of the desired constituent.

BACKGROUND OF INVENTION

The recovery of a specific metal, such as plutonium, from a material containing said metal may be hampered by the formation of insoluble products when the material is reacted with a suitable solvent. For example, the dissolution of plutonium using nitric acid may yield, in addition to soluble plutonium nitrate, polymers of plutonium nitrate, i.e., compounds which do not have the normal composition of plutonium nitrate, and further, these polymers may be insoluble in the acids in which plutonium nitrate is soluble. The above type of dissolution process has generally not been satisfactorily implemented as a continuous or semi-continuous production process since product "polymer" solids may form and collect in holding tanks and filters requiring undesirable shutdown times while removing these precipitated products. Because of the nature of the actinide elements, formation and collection of an element such as plutonium from a material such as impure plutonium metal or a nuclear fuel may create a critical situation even in batch processing (which batch processing may be inefficient, burdensome and time consuming) so that as a consequence there may be an even greater amount of shutdown time and decreased dissolution and recovery of the desired metal element.

SUMMARY OF INVENTION

In view of the above problems, it is an object of this invention to provide continuous dissolution of plutonium.

It is an object of this invention to provide continuous dissolution of a metal from a material wherein insoluble dissolution products may be formed.

It is a further object to provide continuous dissolution means which reduce maintenance and wear of equipment as the use of pumps and other mechanical devices is avoided in the dissolution circuit.

It is a further object to purify plutonium metal for subsequent uses in other processes.

Various other objects and advantages will appear from the following description of the invention, and the most novel features will be particularly pointed out hereinafter in connection with the appended claims. It will be understood that various changes in the details, materials, and arrangements of the parts which are herein described and illustrated in order to explain the nature of the invention may be made by those skilled in the art without departing from the principles and scope of this invention.

The invention comprises continuously dissolving plutonium wherein a high normality acid mixture is fed into a mixing vessel and heated forming vapors which may be thereafter condensed as low normality acid mixture, the condensate being then contacted with the plutonium so as to dissolve said metal and conveying plutonium nitrate and reacted acids by suitable means to the mixing vessel containing the concentrated acid mixture. The desired dissolved metal value is then separated by suitable means.

DETAILED DESCRIPTION

Figure 1:
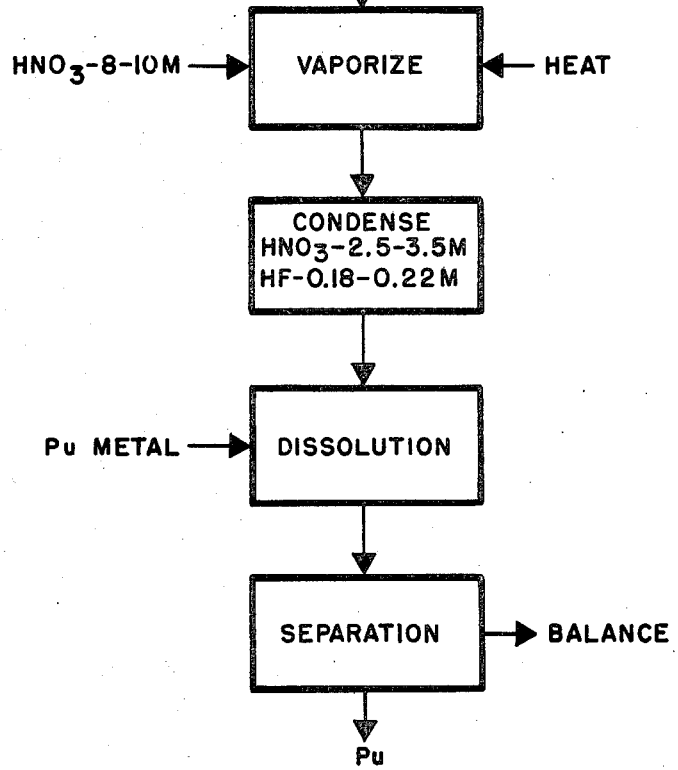
FIG. 1 illustrates a processing sequence as practiced in one embodiment of this invention.

As shown in FIG. 1, a mixture of acids may be heated in a suitable container, vessel or chamber so as to vaporize a portion of the solution. The vapor may be condensed as a lower molarity acid mixture suitable for dissolving a metal such as plutonium. Although FIG. 1 describes this particular plutonium dissolution process, it would be applicable for other similar dissolutions and this invention is not to be construed as being restricted to dissolution of plutonium. The condensed low molarity acid solution reacts with and dissolves the plutonium metal forming plutonium nitrate. Effect of formation of insoluble hydrolysis products, such as polymers of plutonium nitrate, i.e., nitrates containing other than the composition $Pu(NO_3)_3$ in this invention may be averted or minimized by the continuous removal of the reaction products from the low molarity acid dissolution chamber to the high molarity acid chamber where the hydrolysis products are dissolved. The solution from the high molarity acid container may be removed continuously or at intervals so as to thereafter selectively separate the desired constituent from the solution by well known methods such as ion exchange resin processes, fluoride volatility processes or precipitation or salting out techniques. A typical precipitation process may be like that described by S. G. Abrahamson in the Journal of Inorganic and Nuclear Chemistry, vol. 29, pp. 842–844 (1967).

Figure 2:
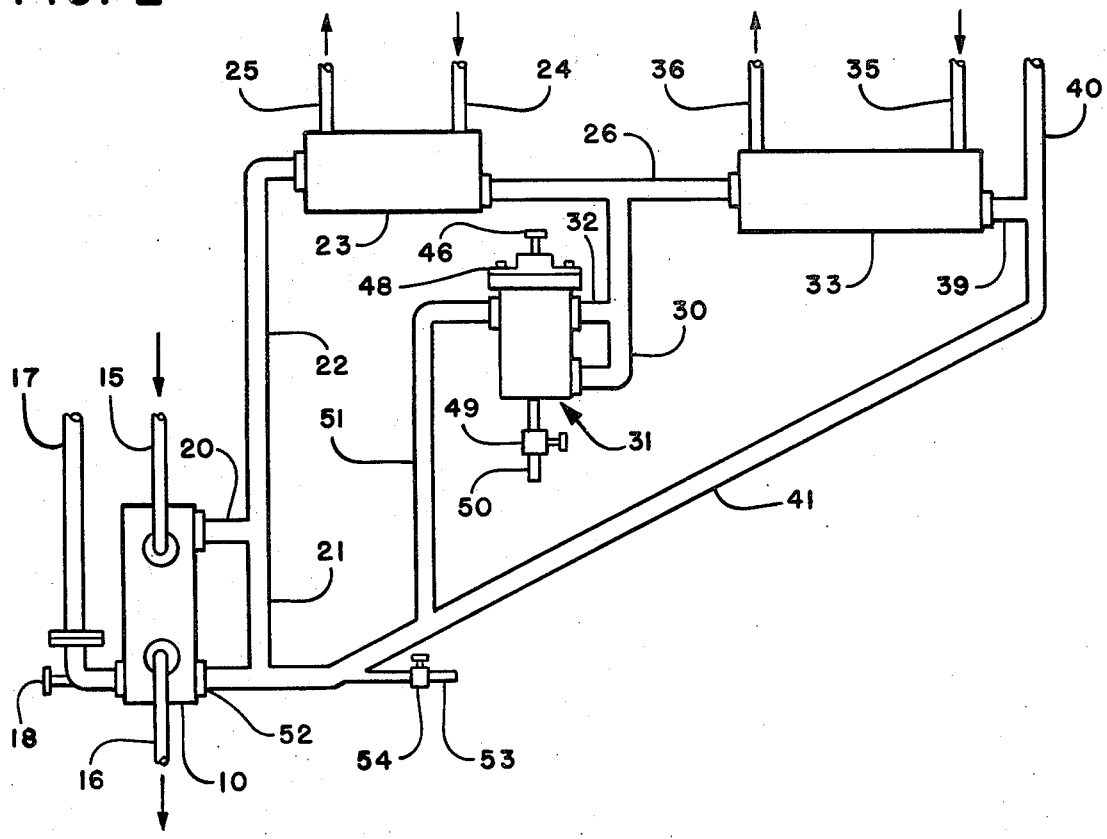
FIG. 2 illustrates somewhat schematically one form of apparatus for dissolving a metal value in accordance with the invention.

Apparatus for the process and the sequence is shown in FIG. 2 wherein a mixing and boiler vessel 10 of suitable size and material to contain the desired high molarity acid or acid mixture for the purposes of this process may be charged as will be described later, with the desired molarity acid mixture, which for dissolution of Pu may be from about 8 to about 10 molar nitric acid with from about 0.04 to about 0.07 (M) molar hydrofluoric acid.

The acid mixture within vessel 10 is heated to vaporization temperature by suitable means such as a steam or electrical heating system. FIG. 2, by way of example, shows inlet conduit 15 wherein steam may be flowed through appropriate conduits within or around vessel 10 to heat the vessel 10 and its contents and thereafter be removed through outlet conduit 16. The height of the acid solution which is maintained at a level below conduit 20, as well as the height of the plutonium nitrate as will be discussed later, within the bath or vessel 10 may be observed or monitored through suitable means such as sight gage or glass 17. Sight gage 17 may also be used to initially charge the boiler vessel 10 and also to add additional concentrated acid as required to vessel 10. The temperature within vessel 10 may be observed by means of such as thermometer 18 disposed to measure the liquid temperature and preferably measuring at some lower portion of vessel 10 as shown in FIG. 2.

The acid mixture within vessel 10 is maintained at a temperature which allows sufficient vaporization of the acid mixture without the vaporization being excessive for the dissolution rate. A suitable temperature range for the nitric-hydrofluoric acid mixture cited above is between about 100° C. and about 120° C., and preferably from about 110° C. to about 118° C. The acid vapor thus produced is removed and conveyed through suitable vapor outlet conduit 20 appropriately disposed in the upper portion of vessel 10, thence through riser 22 past circulating leg and conduit 21 into an appropriate primary condenser 23, which is cooled by water or other coolant in a well known manner. A purpose for disposing circulating leg 21 as shown in FIG. 2 is to prevent or minimize plutonium nitrate salting out and subsequently clogging the pipes. Leg 21 allows for circulation of the acids and plutonium nitrate into chamber 10. Circulation is effected due to the thermal difference of the solution in vessel 10 and in circulating or thermal siphon leg 21. FIG. 2 shows primary condenser 23 cooled by water circulating through inlet conduit 24 and outlet conduit 25 and internal piping (not shown).

The molarity of the components of the condensed mixture may be much reduced from that of the initial value at the mixing vessel 10. The molarity of the nitric-hydrofluoric mixture referred to hereinabove, and which has been vaporized at the temperature cited, may be between about 2.5 M and about 3.5 M nitric acid and between about 0.18 M and about 0.22 M hydrofluoric acid. The condensate leaving condenser 23 flows by gravity feeding through conduit 26 into the liquid vapor disengaging section 30 which allows condensed vapors to enter the dissolution chamber 31 while allowing vapors generated at chamber 31 to be removed by means of conduits 32, 30 and 26 into secondary condenser 33, which in turn is also cooled by water or the like circulating through inlet and outlet piping 35 and 36. Noncondensed vapors passing through secondary condenser 33 may be exhausted through conduit 39 and vent 40 while the condensed vapors return by gravity feeding to vessel 10 through conduit member 41. The secondary condenser 33 may also serve to assist in condensing vapors passing through primary condenser 23.

Dissolution vessel 31 may include appropriate temperature sensor or monitor 46 which monitors the temperature of the low normality acid. It has been found that the acid is at a temperature of between about 70° C. and about 100° C. when it leaves the primary condenser. Of course, the acid temperature in any specific use will be dependent upon the distance from condenser 23 to boiler 10, insulation on conduits, etc. Vessel 31 may also include appropriate conduits, feeders, valves and the like, such as shown by dissolution vessel lid 48 and insoluble material removal valve 49 and conduit 50, to feed material containing the metal (such as plutonium) to be dissolved into vessel 31 and to remove such metal depleted material or samples therefrom respectively. The dissolution vessel 31, may be initially partially charged by removing lid 48, inputting the required molarity acid and/or plutonium metal requiring dissolution and replacing the lid 48. The low molarity acid mixture circulates through vessel 31 from conduit 30 and dissolves the metal sought to be recovered forming soluble metal products such as plutonium nitrate and simultaneously forming hydrolysis products which are insoluble in low molarity acid in vessel 31. It is desired therefore that these insoluble hydrolysis products be continuously removed and dissolved as an integral part of the dissolution apparatus in vessel 10. There may be incidental dissolution of other constituents of the material such as formation of nitrates, but these may not interfere by proper selection of appropriate subsequent separation techniques of the desired metal. Plutonium nitrate formed, along with a percentage of the low normality acid or reacted acid which has formed the hydrolysis products, may be removed by overflow through outlet conduit 51 which may merge into conduit 41 and may be returned to vessel 10 containing the higher molarity acid mixture through such as inlet port 52 from conduit 41. The insoluble hydrolysis products formed in dissolution vessel 31 may then be converted to soluble plutonium nitrate by reaction with the high molarity acid in vessel 10. The plutonium nitrate may then form in vessel 10 as a solution containing a substantial quantity of the metal value which may then be removed either at intervals or continuously through removal conduit 53 and valve 54. Because of the rate of formation of plutonium nitrate, it may be desirable to remove it only at intervals. Conduit 53 may also be used to remove samples for analysis during processing. The height of the plutonium nitrate solution may be observed through sight glass 17 and, if desired, may be removed at intervals, such as where the level of the plutonium nitrate solution reaches a suitable level. The metal in the removed solution may then be separated from the solution by well known separation techniques, such as ion exchange, fluoride volatility or precipitation. A typical process is described by S. G. Abrahamson in the Journal of Inorganic and Nuclear Chemistry, vol. 29, pp. 842–844 (1967).

The apparatus described in FIG. 2 does not require use of pumps, gears, etc., which feature is especially attractive since there is less maintenance and wear of equipment, but may use gravity flow in the configuration generally illustrated. Further, since no moving devices are used, clogging of moving components by hydrolysis products or "polymers" is prevented. The continuous removal of solution containing the dissolved plutonium nitrates also avoids critical buildup of material which could create a potentially dangerous situation.

The below table illustrates results achieved using this invention in several runs of the dissolution of plutonium (Pu) metal.

| | Grams Pu dissolved | Grams of Pu per liter of 9 M $HNO_3$ | Rate Pu dissolution, grams per hour |
|---|---|---|---|
| Run number: | | | |
| 1 | 706.2 | 280.2 | 600 |
| 2 | 250 | 61.2 | 170 |
| 3 | 277 | 69.0 | 280 |

As can be seen from the table, it may be feasible to achieve continuous or semi-continuous production of plutonium using this invention. The rate of plutonium dissolution can be increased or decreased dependent upon the rate desired by proper selection of parameters, such as heat input in the mixing or dissolution process. Using the batch process, Runs 1, 2 and 3 would have taken 3 hours, 1.5 hours and 2 hours, respectively.

Although there is formation of impurity nitrates in this invention, these may be removed in subsequent processes. The object of the invention is to provide apparatus and method for continuous dissolution of plutonium without the formation of insoluble hydrolysis product and this has been accomplished. The plutonium nitrate product may be used as feed to recovery processes including purification of plutonium.

What is claimed is:

1. Apparatus for dissolving plutonium metal comprising a mixing vessel, an open inlet conduit for charging said mixing vessel with a first acid mixture comprising from about 8 molar to about 10 molar nitric acid and from about 0.04 molar to about 0.07 molar hydrofluoric acid means for heating said mixing vessel to vaporize said first acid mixture, condenser means for condensing said vaporized first acid mixture to a second acid mixture of from about 2.5 molar to about 3.5 molar nitric acid and from about 0.18 molar to about 0.22 molar hydrofluoric acid, an open outlet conduit for conveying said first acid mixture vapor from said mixing vessel to said condenser means, a dissolution vessel having disposed therein a material including plutonium metal, an open conduit for gravity feeding said second acid mixture from said condenser to said dissolution vessel, an additional open conduit connected with an upper portion of said dissolution vessel and a lower portion of said mixing vessel for carrying fluid and plutonium dissolution products including plutonium nitrate from said upper portion of said dissolution vessel to said lower portion of said mixing vessel, an open circulating conduit having an upper end connected with said open outlet conduit adjacent an upper portion of said mixing vessel and having a lower end connected with said additional open conduit adjacent said lower portion of said mixing vessel to minimize crystallization of plutonium nitrate by thermal and gravity circulating said heated first acid mixture into said additional open conduit containing cooled plutonium dissolution products, means connected with said additional open conduit adjacent the lower end of said circulating conduit for removing from said mixing vessel a solution containing a high concentration of plutonium nitrate, additional condenser means to condense vapors passing through said initial condenser means and vapors from said dissolution vessel, and a further open conduit communicating with said additional open conduit to return by gravity said condensed vapors to said lower portion of said mixing vessel.

References Cited

UNITED STATES PATENTS

| | | | |
|---|---|---|---|
| 2,660,518 | 11/1953 | White | 23—272.6 S |
| 3,352,645 | 11/1967 | Faugeras | 23—272.6 S |
| 339,201 | 4/1886 | Merz | 23—272.6 S |
| 1,272,744 | 7/1918 | Wells | 23—272.6 S |
| 3,420,746 | 1/1969 | Kaplan | 23—272.6 S |
| 451,816 | 5/1891 | Gilbert | 23—272.6 S |
| 3,652,229 | 3/1972 | Burke | 23—272.6 S |

FOREIGN PATENTS

| | | | |
|---|---|---|---|
| 1,057,572 | 5/1959 | Germany | 23—272.6 S |

OTHER REFERENCES

Luberoff, The Chemical Analyst, vol. 39, No. 2, June 1950, pp. 40–41, copy 23-272.6 S.

IBM Technical Bulletin, vol. 1, No. 5, February 1959, Manko, copy 23-272.6 S.

WILBUR L. BASCOMB, Jr., Primary Examiner

S. J. EMERY, Assistant Examiner

U.S. Cl. X.R.

23—272.7; 423—20